US008403662B2

(12) United States Patent
Mikuriya et al.

(10) Patent No.: US 8,403,662 B2
(45) Date of Patent: Mar. 26, 2013

(54) REACTOR EMPLOYING HIGH-TEMPERATURE AIR COMBUSTION TECHNOLOGY

(75) Inventors: Tomoyuki Mikuriya, Kanagawa (JP); Toshiaki Yoshioka, Kanagawa (JP); Ryoichi Kawabata, Kanagawa (JP); Eiji Watanabe, Kanagawa (JP); Nobuhiro Onda, Kanagawa (JP); Takeo Nikkuni, Kanagawa (JP); Shuhei Wakamatsu, Kanagawa (JP); Susumu Mochida, Kanagawa (JP); Tadahiro Araake, Kanagawa (JP); Hiroyuki Nakamura, Kanagawa (JP)

(73) Assignees: Chiyoda Corporation, Yokohama-Shi (JP); Nippon Furnace Co., Ltd., Yokohama-Shi (JP)

( * ) Notice: Subject to any disclaimer, the term of this patent is extended or adjusted under 35 U.S.C. 154(b) by 617 days.

(21) Appl. No.: 12/665,163

(22) PCT Filed: Jun. 19, 2008

(86) PCT No.: PCT/JP2008/061253
§ 371 (c)(1),
(2), (4) Date: Dec. 17, 2009

(87) PCT Pub. No.: WO2008/156146
PCT Pub. Date: Dec. 24, 2008

(65) Prior Publication Data
US 2010/0143854 A1 Jun. 10, 2010

(30) Foreign Application Priority Data

Jun. 20, 2007 (JP) .................................. 2007-162056
Jun. 20, 2007 (JP) .................................. 2007-162057

(51) Int. Cl.
*F23D 14/66* (2006.01)
(52) U.S. Cl. .............. 431/161; 431/11; 431/36; 431/40; 431/207; 431/167; 431/199; 431/103; 431/203; 431/215; 431/166; 126/91 A; 432/180; 432/175

(58) Field of Classification Search .................. 431/161, 431/36, 11, 40, 207, 103, 167, 199, 203, 431/215, 166, 116, 186, 189, 175, 174; 126/91 A; 432/189, 175, 186, 187, 174, 161
See application file for complete search history.

(56) References Cited

U.S. PATENT DOCUMENTS 4,828,483 A * 5/1989 Finke .............................. 431/11
5,539,964 A 7/1996 Russum et al.
(Continued)

FOREIGN PATENT DOCUMENTS

JP 05-256423 A 10/1993
JP 06-011121 A 1/1994
(Continued)

OTHER PUBLICATIONS

Australian Notice of Acceptance; Nov. 17, 2011.
(Continued)

*Primary Examiner* — Avinash Savani
(74) *Attorney, Agent, or Firm* — Pearne & Gordon LLP

(57) ABSTRACT

A combustion air supply apparatus 9 of alternating heat exchange type supplies combustion air and discharges combustion exhaust gas at a flow velocity of 80 to 200 m/sec. A burner assembly 4 is configured in such a manner that low-caloric fuel gas is pre-heated with heat of pre-combusting high-caloric fuel gas before the low-caloric fuel gas reaches a mixing starting space CA in the combustion chamber where the pre-combusting high-caloric fuel gas and the low-caloric fuel gas come to burn together in a full scale in the mixing starting space CA. When an air amount of the combustion air supplied through the high-temperature air supply ports of the plurality of fuel gas combustion apparatuses is defined as Q1 and an air amount of the pre-combustion air to be mixed with the high-caloric fuel gas, supplied from the fuel gas combustion apparatuses, is defined as Q2, a total air amount (Q1+Q2) is 1.02 to 1.10 times more than a theoretical air amount QS required for combustion, and a ratio of Q2/(Q1+Q2) is 0.011 to 0.047.

14 Claims, 9 Drawing Sheets

U.S. PATENT DOCUMENTS 5,961,312 A     10/1999    Sugiyama et al.
6,033,208 A *   3/2000    Wunning ............... 431/215
6,926,516 B1 *   8/2005    Sudo et al. .................. 431/8

FOREIGN PATENT DOCUMENTS

| | | | |
|---|---|---|---|
| JP | 08-152114 A | 6/1996 |
| JP | 09-222223 A | 8/1997 |
| JP | 09-273741 A | 10/1997 |
| JP | 10-205743 A | 8/1998 |
| JP | 2005-046753 A | 2/2005 |
| JP | 2006-308249 A | 11/2006 |

OTHER PUBLICATIONS

International Search Report for PCT/JP2008/061253 dated Sep. 9, 2008.

* cited by examiner

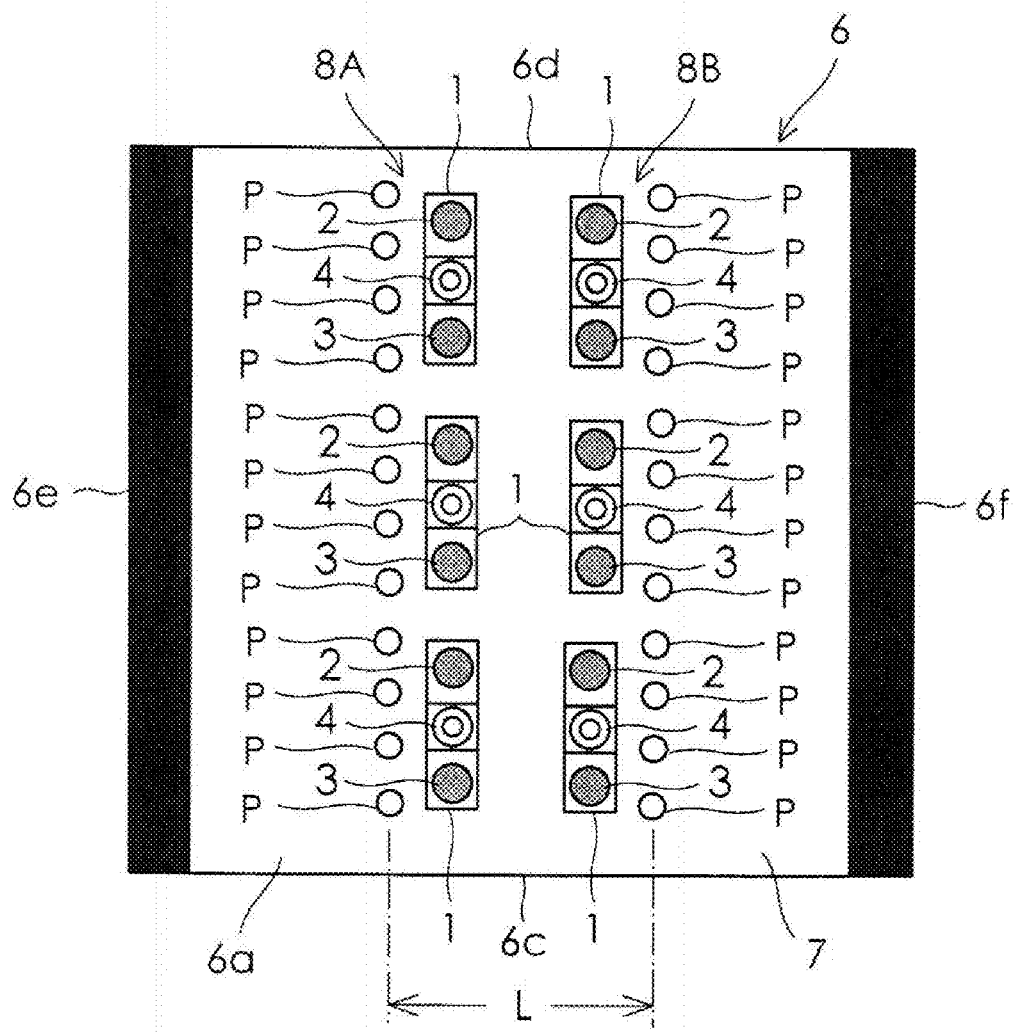

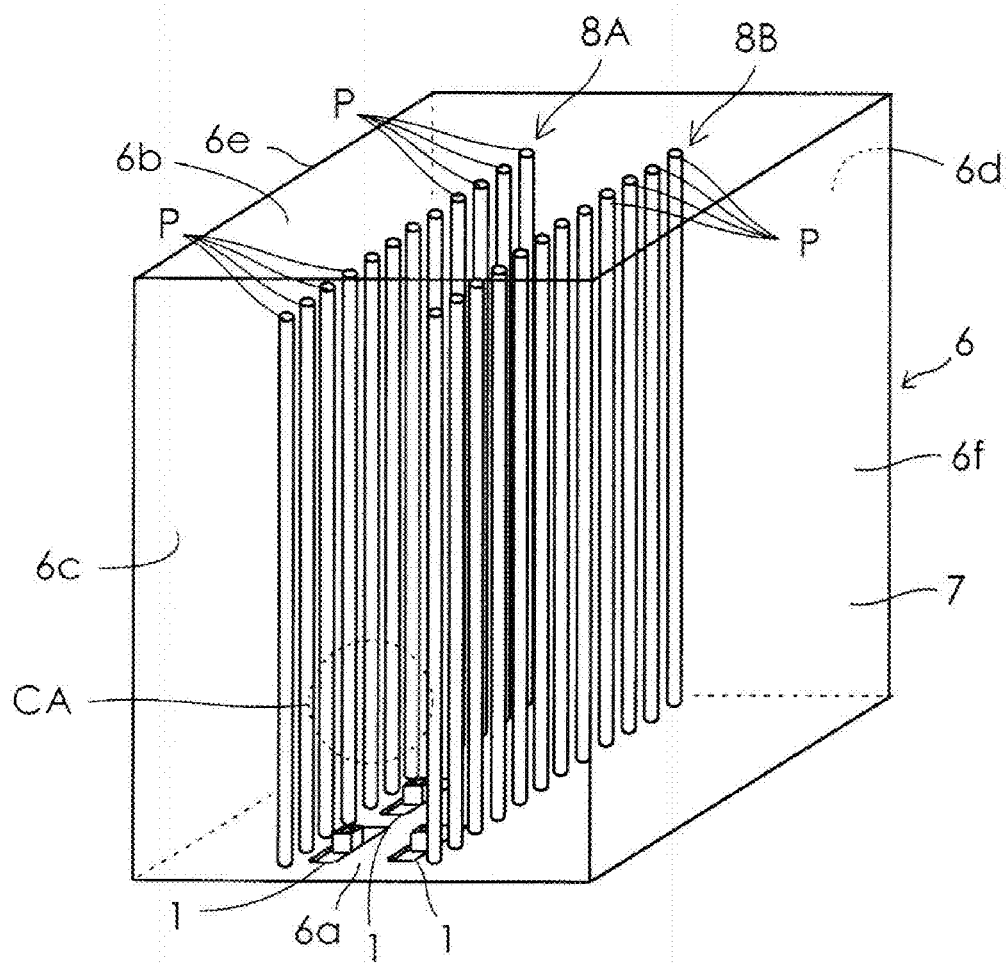

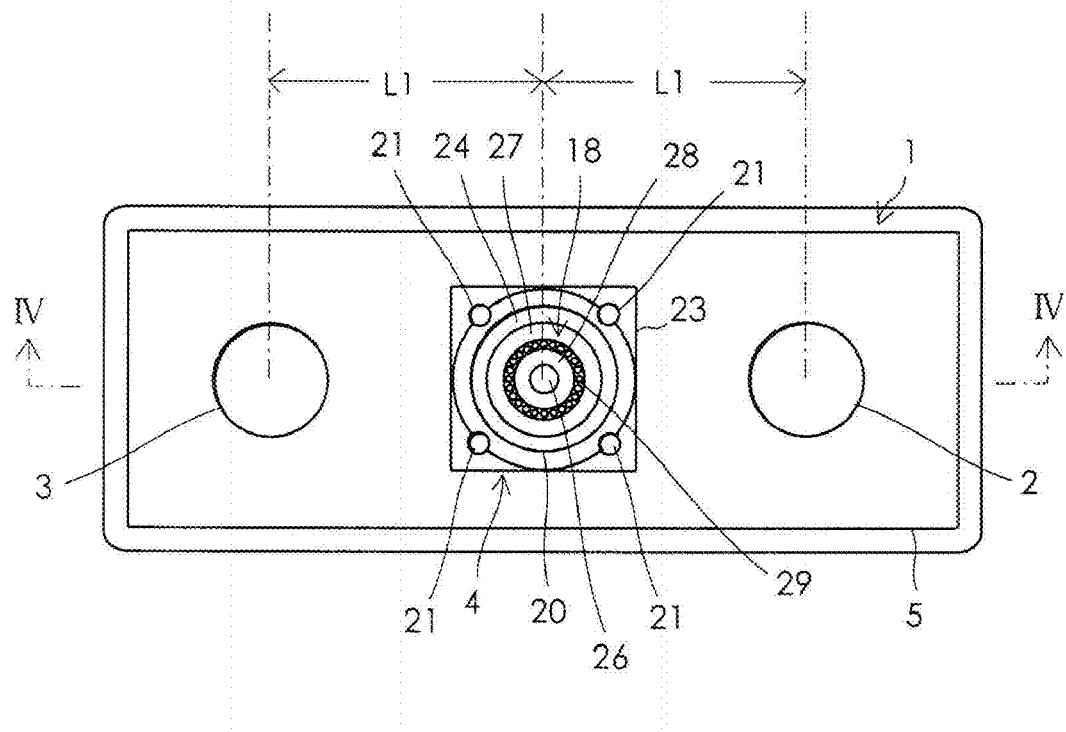

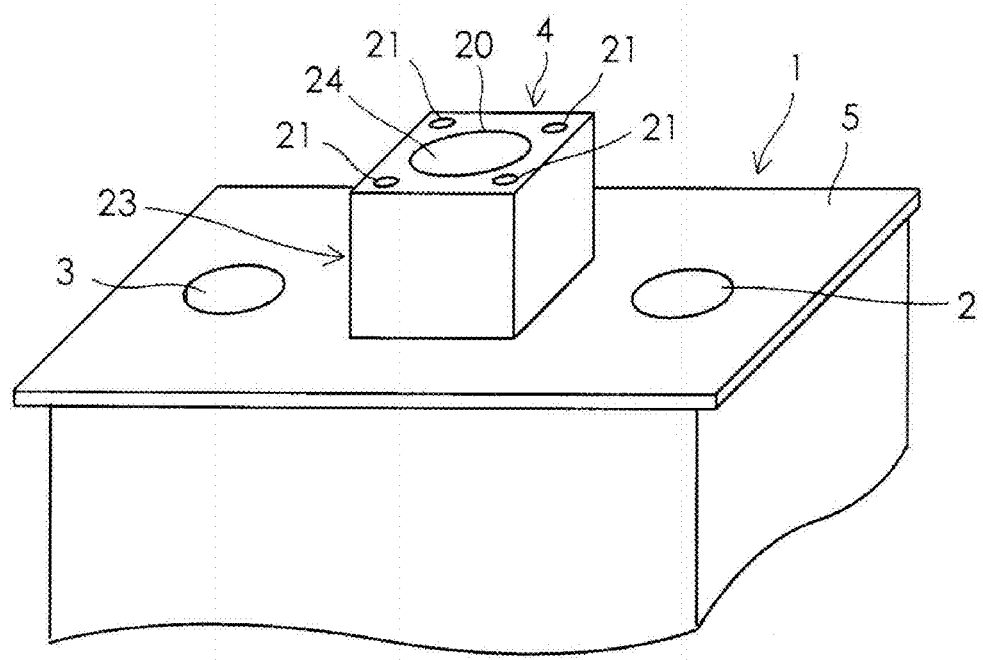

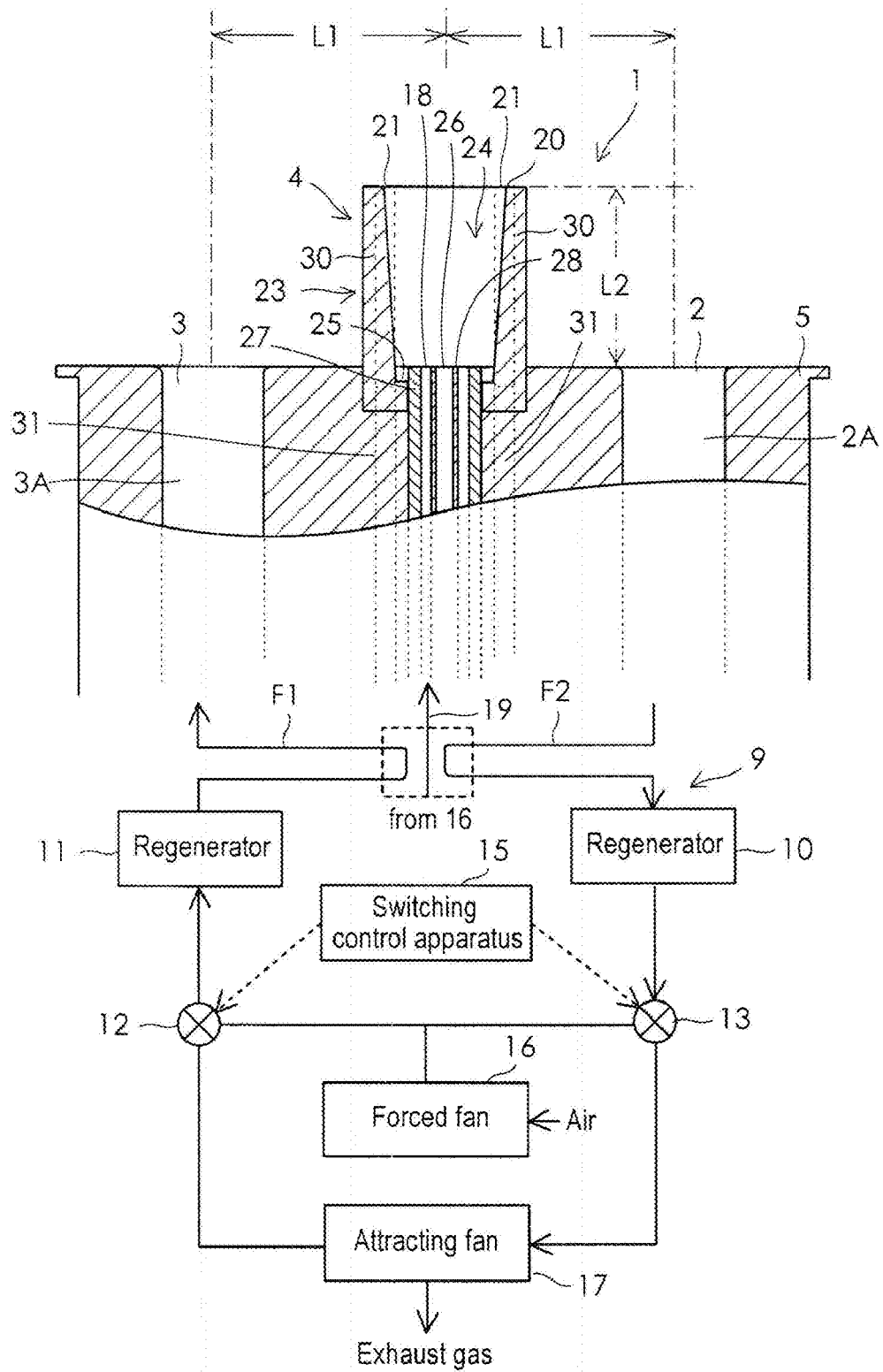

No cylindrical portion

200mm

200mm

400mm

600mm

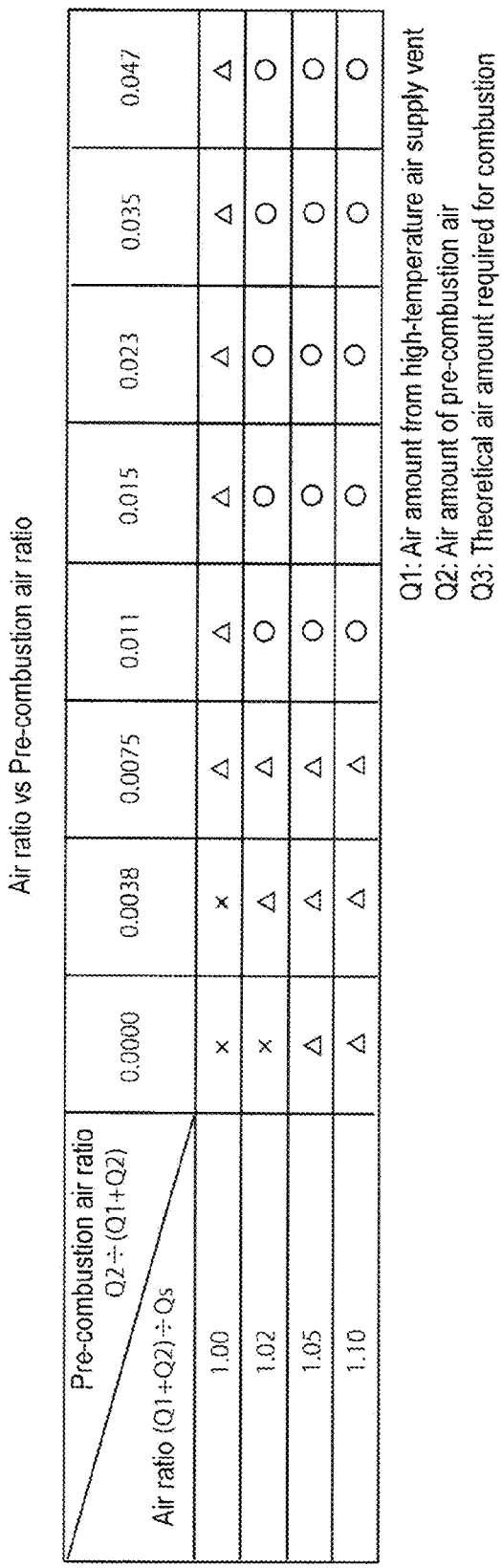

REACTOR EMPLOYING HIGH-TEMPERATURE AIR COMBUSTION TECHNOLOGY

TECHNICAL FIELD

The present invention relates to a reactor employing high-temperature air combustion technology and a fuel gas combustion apparatus suitable for use in the reactor.

BACKGROUND ART

Japanese Patent Application Publication No. 2005-46753 (JP2005-46753A) shows a conventional reactor that uses high-temperature air combustion technology. A fuel gas combustion apparatus used in a reactor employing high-temperature air combustion technology includes a burner assembly that injects fuel gas into a combustion chamber and a combustion air supply apparatus of alternating heat exchange type (hereinafter sometimes referred to simply as a combustion air supply apparatus). Japanese Patent Application Publication No. 10-205743 (JP10-205743A) shows a combustion apparatus that burns low-caloric fuel gas such as blast furnace gas and fart by heating the gas with a regenerator that has air permeability and is provided in the combustion air supply apparatus for heat exchange. The combustion apparatus shown therein burns the low-caloric fuel gas by using as an ignition burner a pilot burner using high-caloric fuel gas as fuel gas. The pilot burner shown therein injects combustion air together with fuel gas into a reactor wherein the combustion air is supplied from a combustion air supply pipe disposed concentrically with a fuel gas supply pipe for supplying the fuel gas.

The pilot burner is intended for use as an ignition burner, but is also used to maintain stable combustion while the temperature inside the reactor is as low as 500 to 600° C. (degrees C.), for example, immediately after the ignition. After the temperature inside the reactor has reached a high temperature, the pilot burner may be turned off. However, the low-caloric fuel gas is not enough to produce a high-temperature air combustion state. Therefore, in a fuel gas combustion apparatus that continuously supplies a fuel and burns fuel gas with the help of combustion air heated by a regenerating means, high-caloric fuel gas injected from a burner assembly using high-caloric fuel gas as the fuel gas is mixed with combustion air heated to a high temperature with a combustion air supply apparatus of alternating heat exchange type in a space of high-temperature combustion.

In the fuel gas combustion apparatus, the high-caloric fuel gas injected from the burner assembly using the high-caloric fuel gas as fuel gas is mixed with the combustion air heated to a high temperature with the combustion air supply apparatus of heat exchange type. Low-caloric fuel gas may be used as fuel gas. However, when the low-caloric fuel gas is used as fuel gas, a large amount of the low-caloric fuel gas is needed and it is difficult to heat such a large amount of the low-caloric fuel gas to a high temperature. Thus, it is hard to use the low-caloric gas in conventional fuel gas combustion apparatuses.

If combustion air, which has been heated with a combustion air supply apparatus of alternating heat exchange type, is supplied to the fuel gas combustion apparatus, unburned fuel gas may be discharged together with combustion exhaust gas to be discharged. Japanese Patent Application Publication No. 9-273741 (JP09-273741A) has proposed that an injection opening of fuel gas should be disposed more inwardly than a discharge opening for combustion exhaust gas in the reactor.

SUMMARY OF INVENTION

Technical Problem

Conventional reactors employing high-temperature air combustion technology focus on producing a high-temperature air combustion state. Therefore, no consideration has been given to the application of the high-temperature air combustion technology to various kinds of low-caloric fuel gas having low caloric power that are generated in a plant since the low-caloric fuel gas has too small caloric power compared with high-caloric fuel gas. If various kinds of fuel gases have different caloric power, combustion cannot be completed at the time of high-temperature air combustion, and accordingly unburned carbon oxide (CO) may be discharged.

An object of the present invention is to provide a reactor employing high-temperature air combustion technology that is capable of effectively utilizing low-caloric fuel gas and reducing CO concentration in exhaust gas.

Another object of the present invention is to provide a fuel gas combustion apparatus that is capable of effectively utilizing low-caloric fuel gas when the high-temperature air combustion technology is applied.

A further object of the present invention is to provide a fuel gas combustion apparatus that is capable of reducing CO concentration in the exhaust gas without lowering exhaust heat recovery performance.

Solution to Problem

A reactor employing high-temperature air combustion technology according to the present invention includes a plurality of fuel gas combustion apparatuses each comprising a burner assembly that continuously injects fuel gas into a combustion chamber, and a combustion air supply apparatus of alternating heat exchange type. The fuel gas combustion apparatus of this kind is called as a fuel gas combustion apparatus of continuous combustion and alternating heat exchange type. The plurality of fuel gas combustion apparatuses are disposed at a predetermined interval. The combustion air supply apparatus has two vent openings that alternately switch to work as a combustion exhaust gas discharge port or a high-temperature air supply port. The combustion air supply apparatus includes one regenerating means and heats combustion air with sensible heat of the regenerating means by alternately flowing the combustion air and exhaust gas through the regenerating means. A typical combustion air supply apparatus of alternating heat exchange type has been disclosed in Japanese Patent Application Publication No. 05-256423 (JP05-256423A) and Japanese Patent Application Publication No. 06-11121 (JP06-11121A). The combustion air supply apparatus of alternating heat exchange type uses one of the two vent openings as a combustion exhaust gas discharge port to discharge combustion exhaust gas out of the combustion chamber via the regenerating means having air permeability. It uses the other vent opening as a high-temperature air supply port to supply combustion air, which has been elevated to a high temperature with sensible heat of the regenerating means, to the combustion chamber. The combustion air is generally heated to a high temperature of at least 800° C. (degrees C.) with sensible heat of the regenerating means. A part of the combustion air thus heated to a high temperature of at least 800° C. (degrees C.) may be used as pre-combustion air to be mixed with the high-caloric fuel gas.

The burner assembly of the present invention has an injection port for continuously injecting pre-combusting high-caloric fuel gas and a plurality of injection ports for continuously injecting low-caloric fuel gas. The high-caloric fuel gas and pre-combustion air are mixed to form the high-temperature pre-combusting high-caloric fuel gas in which the high-caloric fuel gas is partially combusting, and the pre-combusting high-caloric fuel gas is continuously injected into the combustion chamber through the injection port for pre-combusting high-caloric fuel gas. The injection ports for low-caloric fuel gas are disposed apart from each other or are spaced in an area surrounding the injection port for pre-combusting high-caloric fuel gas. The low-caloric fuel gas is pre-heated with heat of the pre-combusting high-caloric fuel gas before the low-caloric fuel gas reaches a mixing starting space in the combustion chamber where the pre-combusting high-caloric fuel gas and the combustion air begin to mix with each other, and then the pre-combusting high-caloric fuel gas and the low-caloric fuel gas come to combust or burn together in a full scale in the mixing starting space. For this purpose, the injection vent for pre-combusting high-caloric fuel gas and the injection ports for low-caloric fuel gas are appropriately positioned or positional relationship of these ports is appropriately determined. The fuel gas burns not only in the mixing starting space but also in a space of high-temperature air combustion. The flow velocity of combustion air to be supplied from the combustion air supply apparatus of alternating heat exchange type is also appropriately determined.

Since the high-caloric fuel gas is mixed with the pre-combustion air and is partially combusting, the temperature of the high-caloric fuel gas has been elevated to a predetermined temperature before it reaches the mixing staring space in the combustion chamber. However, the volume of the low-caloric fuel gas is larger compared with that of the high-caloric fuel gas. Unlike the high-caloric fuel gas, it is difficult to elevate the temperature of the low-caloric fuel gas simply by mixing the low-caloric fuel gas with pre-combustion air of ordinary temperature and letting the low-caloric fuel gas partially combusting or burning. To solve this issue, in the present invention, the injection ports for low-caloric fuel gas are disposed apart from each other or are spaced around the injection port for pre-combusting high-caloric fuel gas so that the low-caloric fuel gas may flow to the mixing staring space along with the flowing pre-combusting high-caloric fuel gas. The low-caloric fuel gas has been heated with heat of the pre-combusting high-caloric fuel gas before it reaches the mixing starting space. Thus, in the present invention, the high-caloric fuel gas that has been heated with the pre-combustion air and the low-caloric fuel gas may be mixed with the combustion air in the mixing starting space, and then come to efficiently burn together. According to the present invention, the low-caloric fuel gas may effectively be utilized even when the high-temperature air combustion technology is employed.

Especially, in the reactor of the present invention, the combustion air supply apparatus of alternating heat exchange type supplies the combustion air and discharges the combustion exhaust gas at a flow velocity of 80 to 200 m/sec. When an air amount of the combustion air supplied through the high-temperature air supply ports of the plurality of fuel gas combustion apparatuses is defined as $Q1$ and an air amount of the pre-combustion air to be mixed with the high-caloric fuel gas, supplied from the fuel gas combustion apparatuses, is defined as $Q2$, a total air amount ($Q1+Q2$) is determined to be 1.02 to 1.10 times more than a theoretical air amount $QS$ required for combustion, and a ratio of $Q2/(Q1+Q2)$ to be 0.011 to 0.047.

When the combustion air supply apparatus of an alternating heat exchange type as mentioned above is used, if the air amounts and air ratio are determined as described above, stable combustion may be accomplished and CO concentration may be reduced, thereby more efficiently utilizing the fuel gas than before. The numeric ranges for the air amounts and air ratio, within which CO concentration may be reduced and fuel gas may efficiently be used, have been obtained through testing on a condition that stable combustion should be accomplished. Therefore, it is meaningless to discuss on individual critical limits for the numeric ranges.

When the plurality of injection ports for low-caloric fuel gas are disposed at an equidistant interval in a circumferential direction of an imaginary circle defined with respect of the center of the injection port for pre-combusting high-caloric fuel gas, the low-caloric fuel gas may flow around the pre-combusting high-caloric fuel gas in a balanced manner. Flows of the low-caloric fuel gas do not significantly hinder or disturb the flow of the pre-combusting high-caloric fuel gas. As a result, stable high-temperature air combustion may be accomplished.

Preferably, the injection port for pre-combusting high-caloric fuel gas and the injection ports for low-caloric fuel gas may be projecting more inwardly than the two vent openings in the combustion chamber. With this configuration, the pre-combusting high-caloric fuel gas and the low-caloric fuel gas may readily reach the mixing starting space in the combustion chamber. Consequently, the low-caloric fuel gas may be utilized more efficiently than before. Here, a distance $L1$ between the centerline of the injection port for pre-combusting high-caloric fuel gas and the centerline of either of the two vent openings, and a height $L2$ from the two vent openings to the injection port for pre-combusting high-caloric fuel gas and the injection ports for low-caloric fuel gas are defined to satisfy the following conditions. The first condition is that a part of the pre-combusting high-caloric fuel gas injected from the injection port for pre-combusting high-caloric fuel gas and/or a part of the low-caloric fuel gas injected from the injection ports for low-caloric fuel gas should be suppressed from being discharged through the vent opening working as the combustion exhaust gas discharge port before the pre-combusting high-caloric fuel gas and the low-caloric fuel gas reach the mixing starting space. The second condition is that the combustion exhaust gas may partially be prevented from being drawn into the combustion exhaust gas discharge port due to the existence of the pre-combusting high-caloric fuel gas injected from the injection port for pre-combusting high-caloric fuel gas and the low-caloric fuel gas injected from the injection ports for low-caloric fuel gas. If the first condition is satisfied, the pre-combusting high-caloric fuel gas and the low-caloric fuel gas may be prevented from being discharged through the vent opening and burning outside the combustion chamber. If the second condition is satisfied, a part of the combustion exhaust gas flowing toward the vent opening working as the combustion exhaust gas discharge port may be returned to the mixing starting space together with the fuel gas for re-combustion, thereby suppressing the discharge amount of unburned gas (e.g. CO and H) contained in the combustion exhaust gas. Thus, circulation inside the reactor may be increased and the temperature inside the reactor may be uniformed more than before.

Preferably, the two vent openings and the injection port for pre-combusting high-caloric fuel gas may be arranged in a line as viewed from above with the injection port for pre-combusting high-caloric fuel gas disposed in the center of the line. Here, when the combustion air is supplied and the combustion exhaust gas is discharged at a flow velocity of 80 to 200 m/sec, it is preferable that the distance L1 between the centerline of the injection port for pre-combusting high-caloric fuel gas and the centerline of either of the two vent openings may be 350 to 500 mm, and that a height L2 of a fireproof cylindrical portion, which will be described later, may be 50 to 600 mm. When the distance L1 is determined to be 350 to 500 mm, a distance PCD between the centers of the two vent openings, which is two times longer than the distance L1, and a diameter Da of each of the two vent openings may preferably be determined so that a ratio of PCD/Da may be 3 to 6.5. Here, on an assumption that a relationship of a possible setting for the ratio of PCD/Da and the flow velocity is defined as a lower-limit relationship when the distance PCD is 700 mm and the flow velocity is varied within a range of 80 to 200 m/sec and that a relationship of a possible setting for the ratio of PCD/Da and the flow velocity is defined as an upper-limit relationship when the distance PCD is 1000 mm and the flow velocity is varied within a range of 80 to 200 m/sec, the ratio of PCD/Da and the diameter Da may be determined so that a relationship between the ratio of PCD/Da and the flow velocity may fall within a range defined by the lower-limit relationship and the upper-limit relationship. With these definitions, the first and second conditions mentioned above are satisfied. The pre-combusting high-caloric fuel gas and the low-caloric fuel gas may be stably burned in the high-temperature air combustion space in the combustion chamber.

Preferably, the burner assembly may include a fireproof cylindrical portion that is configured as described below. In the present disclosure, the fireproof cylindrical portion is not limited to a cylinder having a cross-sectional shape of a circle. The fireproof cylindrical portion has in a central location thereof the injection port for pre-combusting high-caloric fuel and a pre-combustion chamber communicating with the injection port for pre-combusting high-caloric fuel gas. The fireproof cylindrical portion has an injection port for high-caloric fuel gas and an injection port for pre-combustion air on a bottom portion of the pre-combustion chamber. The fireproof cylindrical portion also has the plurality of injection ports for low-caloric fuel gas disposed at a predetermined interval in a circumferential direction to surround the injection port for pre-combusting high-caloric fuel gas, and low-caloric fuel gas passages disposed to surround the pre-combustion chamber and communicating with the injection ports for low-caloric fuel gas. Since the burner assembly is provided with such a fireproof cylindrical portion, the injection port for pre-combusting high-caloric fuel gas and the injection ports for low-caloric fuel gas may readily be arranged in predetermined positions with a simple configuration.

A fuel gas combustion apparatus of the present invention comprises a burner assembly for continuously injecting fuel gas into the combustion chamber, and a combustion air supply apparatus of alternating heat exchange type. The combustion air supply apparatus of alternating heat exchange type has two vent openings and alternately uses one of the two vent openings as a combustion exhaust gas discharge port and the other vent opening as a high-temperature air supply port. The combustion air supply apparatus uses one of the two vent openings as a combustion exhaust gas discharge port to discharge combustion exhaust gas out of the combustion chamber via regenerating means having air permeability. The combustion air supply apparatus uses the other vent opening as a high-temperature combustion air supply port to supply combustion air, which has been elevated to a high temperature with sensible heat of the regenerating means, to the combustion chamber.

In the present invention, the pre-combustion air may be heated with heat of the combustion exhaust gas discharged from the combustion air supply apparatus of alternating heat exchange. Thus, not cold pre-combustion air, but heated pre-combustion air may be supplied into the combustion chamber, thereby increasing the reactor performance. Specifically, a pre-combustion air passage through which the pre-combustion air passes may be provided between two flow passages arranged between the two vent openings and two of the regenerating means in such a manner that thermal transfer may be enabled or allowed between the pre-combustion air passage and the two flow passages.

BRIEF DESCRIPTION OF DRAWINGS

FIGS. 1A and 1B each show an example arrangement of a composite assembly having a burner and vent openings, and reaction pipes in a reactor when a fuel gas combustion apparatus is applied to a reactor for reforming.

FIG. 2 is a top plan view of the composite assembly having a burner and vent openings.

FIG. 3 is a partial perspective view of the composite assembly having a burner and vent openings.

FIG. 4 is a partial cross-sectional view of the composite assembly having a burner and vent openings, and illustrates a relationship of the composite assembly having a burner and vent openings with a combustion air supply apparatus of alternating heat exchange type disposed below the composite assembly having a burner and vent openings.

FIG. 8 shows a table indicating the combustion states when the air ratio and the pre-combustion air ratio are varied.

DESCRIPTION OF EMBODIMENT

Figure 5A:
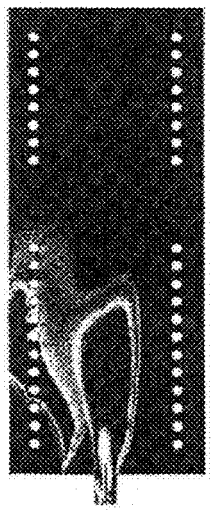
FIGS. 5A and 5B each illustrate a combustion state when analyzed by simulation based on an analysis model, provided that combustion air is supplied and combustion exhaust gas is discharged at a flow velocity of 200 m/sec, the distance L1 is 500 mm, and the height L2 of the fireproof cylindrical portion is 0 mm and 200 mm.

An embodiment of the present invention will now be described hereinbelow with reference to accompanying drawings. FIGS. 1A and 1B each show an example arrangement of a composite assembly 1 having a burner and vent openings, and reaction pipes P in a reactor when a fuel gas combustion apparatus is applied to a reactor. FIG. 2 is a top plan view of the composite assembly 1 having a burner and vent openings. FIG. 3 is a partial perspective view of the composite assembly 1 having a burner and vent openings. The composite assembly 1 having a burner and vent openings includes two vent openings 2, 3 that are used as a combustion exhaust gas discharge port and a high-temperature air supply port, and a burner assembly 4. The vent openings 2, 3 and the burner assembly 4 are combined in structure and supported by a fireproof structural member 5.

In FIGS. 1A and 1B, a reactor body is designated at a reference numeral 6, including a combustion chamber 7 therein. The reactor body 6 includes a bottom wall (or a reactor floor) 6a and a top wall (a reactor ceiling) 6b, a pair of side walls 6c, 6d disposed in a lateral direction, and a pair of side walls 6e, 6f disposed in a width direction. The bottom wall (or the reactor floor) 6a of the reactor body 6 is supported by a supporting assembly, not shown. A plurality of reaction pipes P are disposed to run through the bottom wall 6a and the top wall 6b of the reactor body 6. In this embodiment, two reaction pipe rows 8A, 8B each including reaction pipes (in the figure, 12 pipes) are disposed at an interval L in parallel to each other. In this embodiment, the reaction pipes are disposed at substantially an equidistant interval in each reaction pipe row. In other words, a distance between two adjacent reaction pipes P, P is substantially equal in each reaction pipe row. In this embodiment, six composite assemblies 1 each having a burner and vent openings are disposed on the bottom wall 6a of the reactor body 6.

FIG. 4 shows a partial cross-sectional view of the composite assembly 1 having a burner and vent openings as taken along line IV-IV in FIG. 2, and illustrates a relationship of the composite assembly 1 having a burner and vent openings with a major part of the combustion air supply apparatus 9 of alternating heat exchange type disposed below the composite assembly 1 having a burner and vent openings. The combustion air supply apparatus 9 of alternating heat exchange type discharges combustion exhaust gas of the combustion chamber 7 to the outside of the reactor through two flow passages F1, F2 and one of two regenerating means 10, 11 having air permeability. The combustion air supply apparatus also supplies combustion air, which has been elevated to a high temperature with sensible heat of the regenerating means 10 or 11, into the combustion chamber 7 along an extending direction (or an axial direction) of the reaction pipes P. Air supply/discharge passages 2A, 3A respectively connected to the vent openings 2, 3 are connected to the flow passages F1, F2 disposed in a duct assembly that is not specifically illustrated. The flow passages F1, F2 guide the combustion exhaust gas, which flows through the air supply/discharge passages 2A, 3A, to the regenerating means 10, 11. It also guides the combustion air, which has been heated with the regenerating means 10, 11 to the air supply/discharge passages 2A, 3A. As shown in FIG. 4, the duct assembly is configured to heat air flowing through a pre-combustion air passage 19, which will be described later, with heat of the combustion exhaust gas or combustion air flowing through the two flow passages F1, F2. The duct assembly is capable of thermal transfer between the pre-combustion air passage 19 and the two flow passages F1, F2. With this configuration, the heat of the combustion exhaust gas and combustion air may also be utilized to heat the pre-combustion air, and then the heated pre-combustion air gets into the combustion chamber 7, thereby increasing the reactor performance.

In FIG. 4, the vent opening 3 is used as a high-temperature air supply port and the vent opening 2 is used as a combustion exhaust gas discharge port, and arrows indicate the fluid flows. Whether either of the regenerating means 10, 11 should be used to heat the combustion air, or either of them should be used to store the heat of the combustion exhaust gas is determined by a switching control apparatus 15 to control switching of switching control valves 12, 13 disposed in the midway of the duct assembly. The switching valves 12, 13 are used to connect the regenerating means 10, 11 to either one of a forced fan 16 and an attracting fan 17.

As shown in FIG. 4, when the vent opening 3 is used as a high-temperature air supply port and the vent opening 2 is used as a combustion exhaust gas discharge port, the switching control valve 12 connects the regenerating means 11 to the forced fan 16, and the switching control valve 13 connects the regenerating means 10 to the attracting fan 17. When the vent opening 2 is used as a high-temperature air supply port and the vent opening 3 is used as a combustion exhaust gas discharge port, the switching control valve 12 connects the regenerating means 11 to the attracting fan 17, and the switching control valve 13 connects the regenerating means 10 to the forced fan 16. In this embodiment, the combustion air is heated to at least 800° C. (degrees C.) with sensible heat of the regenerating means.

The burner assembly 4 has an injection port 20 for pre-combusting high-caloric fuel gas and four injection ports 21 for low-caloric fuel gas. The high-caloric fuel gas and pre-combustion air are mixed to form high-temperature pre-combusting high-caloric fuel gas, and the pre-combusting high-caloric fuel gas is continuously injected into the combustion chamber through the injection port 20 for pre-combusting high-caloric fuel gas. The low-caloric fuel gas is continuously injected into the combustion chamber through the four injection ports 21 for low-caloric fuel gas. The injection port 20 for pre-combusting high-caloric fuel gas and the four injection ports 21 for low-caloric fuel gas are integrally formed with a fireproof material to form a fireproof cylindrical portion 23. The fireproof cylindrical portion 23 has in a central location the injection port 20 for pre-combusting high-caloric fuel gas thereof and includes a pre-combustion chamber 24 communicating with the injection port 20 for pre-combusting high-caloric fuel gas. The fireproof cylindrical portion 23 has an injection port 26 for high-caloric fuel gas and an injection port 18 for pre-combustion air on a bottom portion 25 of the pre-combustion chamber 24. In this embodiment, a double pipe penetrates the bottom portion 25. The double pipe includes an outer pipe 27 through which the pre-combustion air flows and an inner pipe 28 through which the high-caloric fuel gas flows. The outer pipe 27 and inner pipe 28 are disposed concentrically. Though not shown in FIG. 4, as shown in FIG. 2, a pre-combustion air nozzle 29 is fitted into between the end of the outer pipe 27 and the end of the inner pipe 28. In the pre-combustion chamber 24, the pre-combustion air and the high-caloric fuel gas are mixed to form the high-temperature pre-combusting high-caloric fuel gas in which the high-caloric fuel gas is partially combusting is generated. A part of the pre-combusting high-caloric fuel gas is combusting due to the presence of the pre-combustion air, but a major part thereof remains unburned. In this condition, pre-combusting high-caloric fuel gas reaches a mixing starting space CA, which will be described later, inside the combustion chamber 7. The outer pipe 27 and the inner pipe 28 extend inside the fireproof structural member 5. At the time of combustion, the high-caloric fuel gas is continuously supplied from a high-caloric fuel gas (e.g. natural gas) source, not shown, to the inner pipe 28 through flow rate controlling means such as a throttle valve.

The fireproof cylindrical portion 23 also has the four injection ports 21 for low-caloric fuel gas disposed at a predetermined interval in a circumferential direction to surround the injection port 20 for pre-combusting high-caloric fuel gas, and four low-caloric fuel gas passages 30 disposed to surround the pre-combustion chamber and communicating with the injection ports 21 for low-caloric fuel gas. The four low-caloric fuel gas passages 30 are connected to four low-caloric fuel gas extension passages 31 disposed inside the fireproof structural member 5. Various low-caloric fuel gases produced in a plant are continuously supplied to the four low-caloric fuel gas extension passages 31 through flow rate controlling means such as throttle valves. When the reactor is a hydrogen generating plant, offgas (or purge gas containing hydrogen) remaining after hydrogen product has been extracted from reformed gas for hydrogen purification may be used as low-caloric fuel gas. In this embodiment, the four injection ports 21 for low-caloric fuel gas are disposed at an angular interval of 90 degrees in a circumferential direction. They may be disposed apart from each other or be spaced in an area surrounding the injection port 20 for pre-combusting high-caloric fuel gas. The injection ports 21 for low-caloric fuel gas may be disposed at a non-equidistant interval.

The pre-combusting high-caloric fuel gas is mixed with the combustion air supplied from the vent opening 2 or 3 in the mixing starting space CA (refer to FIG. 1) defined above the composite assembly 1 having a burner and vent openings. The low-caloric fuel gas injected from the injection port 21 for low-caloric fuel gas is pre-heated with heat of the pre-combusting high-caloric fuel gas and then come to partially combust or burn before reaching the mixing starting space in the combustion chamber. The dimensions of individual portions of the burner assembly and injecting velocities of individual gases and the combustion air are determined so that, on reaching the mixing starting space CA, the pre-combusting high-caloric fuel gas and the low-caloric fuel gas may be mixed with the combustion air in the mixing starting space CA, and then start combusting or burning in a full scale.

Next, the following section will describe a preferable relationship of a distance L1 between the centerline of the injection port 20 for pre-combusting high-caloric fuel gas and the centerline of either of the two vent openings 2, 3 and a height L2 from the two vent openings 2, 3 to the injection port 20 for pre-combusting high-caloric fuel and the injection ports 21 for low-caloric fuel gas. Preferably, the distance L1 and the height L2 may be defined to satisfy the following two conditions. The first condition is that apart of the pre-combusting high-caloric fuel gas injected from the injection port 20 for pre-combusting high-caloric fuel gas and/or a part of the low-caloric fuel gas injected from the injection ports 21 for low-caloric fuel gas may be suppressed from being discharged through the vent opening 2 or 3 working as a combustion exhaust gas discharge port before the pre-combusting high-caloric fuel gas and the low-caloric fuel gas reach the mixing starting space CA below the high-temperature combustion space. Here, the term "high-temperature combustion space" means a space located higher than the mixing starting space, where combustion is performed with high-temperature air. The second condition is that the combustion exhaust gas may partially be prevented from being drawn into the combustion exhaust gas discharge port due to the existence of the pre-combusting high-caloric fuel gas injected from the injection port 20 for pre-combusting high-caloric fuel gas and the low-caloric fuel gas injected from the injection ports 21 for low-caloric fuel gas. When the distance L1 is defined to satisfy the first and second conditions mentioned above, a part of the combustion exhaust gas flowing toward the vent opening working as the combustion exhaust gas discharge port may be returned to the high-temperature combustion space together with the fuel gas for re-combustion, thereby suppressing the discharge amount of unburned gas (e.g. CO and H) contained in the combustion exhaust gas.

Specifically, the combustion air should be supplied and the combustion exhaust gas should be discharged at a flow velocity of 80 to 200 m/sec, and the distance L1 between the centerline of the injection port 20 for pre-combusting high-caloric fuel gas and the centerline of either of the two vent openings 2, 3 should be 350 to 500 mm. The height of the fireproof cylindrical portion 23 should be 50 to 600 mm. Further, the ratio of L1/L2 is should be 1 to 10. Especially, when the ratio of L1/L2 is within a range of 2 to 5, some amount of the combustion exhaust gas circulates inside the combustion chamber 7, and then burns or combusts again. Such recirculation phenomenon may effectively reduce the amount of CO in the combustion exhaust gas. Preferably, a distance PCD between the centers of the two vent openings 2, 3, which is two times longer than the distance L1 (PCD=2L1), and a diameter Da of each of the two vent openings may be determined so that a ratio of PCD/Da may be 3 to 6.5. With these numeric settings, stable combustion of the pre-combusting high-caloric fuel gas and the low-caloric fuel gas may be expected in the high-temperature air combustion space.

Figure 5B:
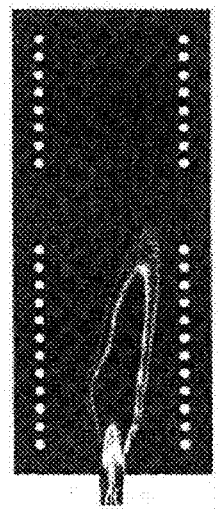

Next, the grounds for the above-mentioned numeric settings will be described below. FIGS. 5A and 5B each illustrate a combustion state when analyzed by simulation based on an analysis model, provided that the combustion air is supplied and the combustion exhaust gas is discharged at a flow velocity of 200 m/sec, the distance L1 is 500 mm, and the height L2 of the fireproof cylindrical portion 23 is 0 mm (there is no cylindrical portion) and 200 mm. As known by comparing FIG. 5A with FIG. 5B, when there is no cylindrical portion 23 (L2=0 mm), a part of the fuel gas is drawn into the vent opening. The following table shows the height dimensions of the cylindrical portion 23 and CO concentrations in the combustion exhaust gas discharged.

TABLE 1

| Height [mm] | 0 | 50 | 100 | 200 | 400 | 600 |
|---|---|---|---|---|---|---|
| CO Concentration [ppm] | 2441 | 1635 | 1151 | 4 | 0.05 | 320 |

It is known from TABLE 1 that CO concentration decreases when the height L2 of the fireproof cylindrical portion 23 is 400 mm. In a practical viewpoint, the height L2 may preferably be within a range of 50 to 600 mm. The preferable height of the fireproof cylindrical portion depends upon how to determine a target value for decreased CO concentration. When the height of the fireproof cylindrical portion 23 is 50 mm, CO concentration decreases by at least 30% from the one when the height is 0 mm. Even this level is sufficient in the practical viewpoint. TABLE 1 does not refer to heights more than L2 of 600 mm. When the height L2 is extended more, a part of the combustion exhaust gas flowing toward the vent opening working as a combustion exhaust gas discharge port is not readily returned together with the fuel gas to the high-temperature air combustion space for re-combustion. Therefore, the height L2 is limited up to 600 mm.

Figure 6A:
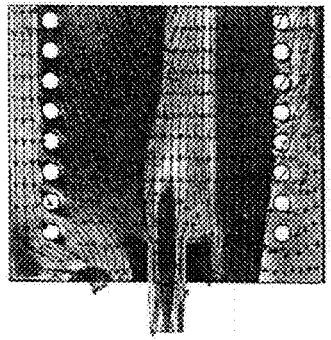
FIGS. 6A, 6B, and 6C illustrate flows of gas inside the combustion chamber as simulated.
Figure 6B:
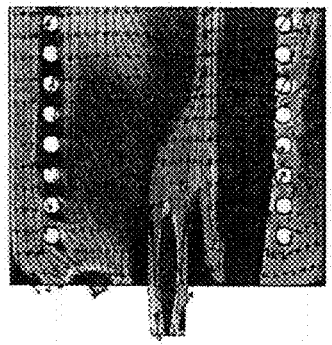
Figure 6C:
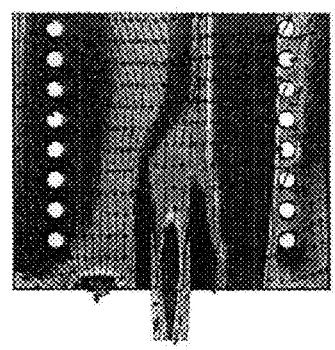

FIGS. 6A, 6B, and 6C illustrate flows of gas inside the combustion chamber 7 as simulated in the same conditions as those for FIG. 5. As known from this figure, when the height of the fireproof cylindrical portion 23 is 200 mm or 900 mm, a phenomenon (recirculation) where the combustion exhaust gas, which is going to be drawn into the combustion exhaust gas discharge port, is returning along the flow of the fuel gas. When the height of the fireproof cylindrical portion 23 is 600 mm, the recirculation phenomenon is hard to occur, and a major part of the combustion exhaust gas starts to be discharged. When there is no fireproof cylindrical portion 23, a part of the fuel gas is directly discharged through the combustion exhaust gas discharge port, and CO concentration significantly increases.

When the distance L1 between the centerline of the injection port 20 for pre-combusting high-caloric fuel gas and the centerline of either of the vent openings 2 or 3 is too short or too long, the effect obtained from the presence of the fireproof cylindrical portion 23 is hardly obtained, namely, the recirculation phenomenon is unlikely to occur. The appropriate numeric range of the distance L1 is 350 to 500 mm. This numeric range setting is determined by confirming through testing that a preferable ratio of PCD/Da is 3 to 6.5 (where PCD denotes the distance between the centers of the two vent openings 2, 3, which is two times longer than the distance L1

(PCD=2L1), and Da denotes the diameter of each of the two vent openings), and that a preferable ratio of L1/L2 is 1 to 10.

Figure 7:
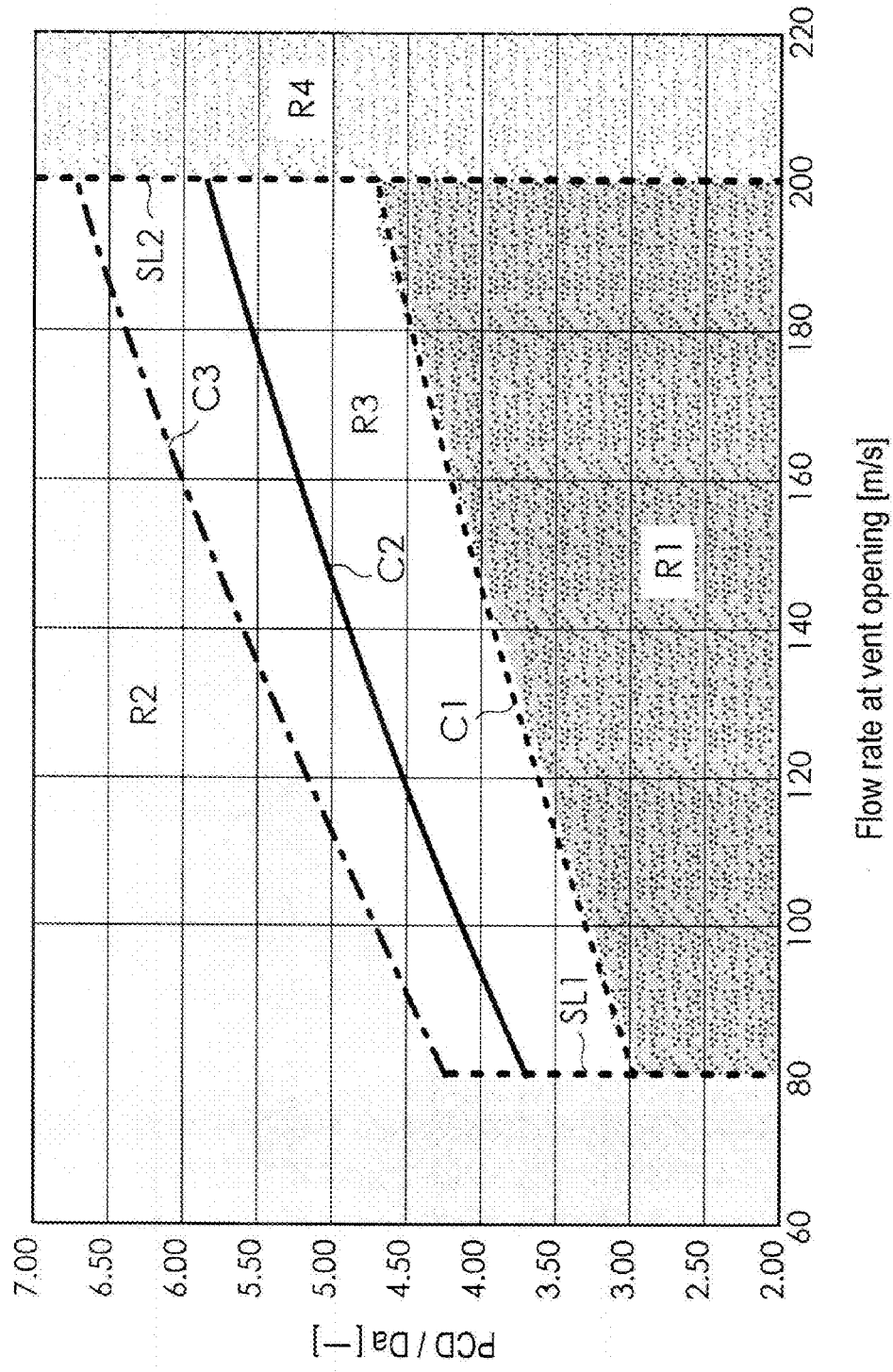
FIG. 7 shows a relationship of a possible setting for PCD/Da with the flow velocity when the flow velocity at the vent opening is varied within a range of 80 to 200 m/sec.

Curved lines C1, C2, and C3 shown in FIG. 7 respectively indicate relationships of a possible setting for PCD/Da on a condition that the height of the fireproof cylindrical portion 23 is 200 mm; the distance PCD (=2L1) is 700 mm, 870 mm, and 1000 mm; and the flow velocity of supplying the combustion air and discharging the combustion exhaust gas is varied within a range of 80 to 200 m/sec when the distance PCD is fixed. Curved line C1 indicates a lower-limit relationship of a possible setting for the ratio of PCD/Da and the flow velocity when the distance PCD is 700 mm and the flow velocity is varied within a range of 80 to 200 m/sec. In a region R1 below the lower-limit relationship, namely, in a region R1 below the curbed line C1 indicating the lower-limit relationship, the fuel gas and air are rapidly mixed when they approach close to each other, thereby causing accelerated combustion and increasing NOx in the combustion exhaust gas. Curved line C3 indicates an upper-limit relationship of a possible setting for the ratio of PCD/Da and the flow velocity when the distance PCD is 1000 mm and the flow velocity is varied within a range of 80 to 200 m/sec. In FIG. 7, a straight line SL1 vertically extending indicates an appropriate range for a possible setting for the ratio of PCD/Da when the flow velocity of the combustion exhaust gas at the vent opening is constant at 80 m/sec, and the distance PCD is varied within a range of 700 to 1000 mm. In a region R2 on the left side of the straight line SL1 and above the curved line C3, the fuel gas and air are not mixed sufficiently, thereby causing unstable combustion. Also, in FIG. 7, a straight line SL2 vertically extending indicates an appropriate range for a possible setting for the ratio of PCD/Da when the flow velocity of the combustion exhaust gas at the vent opening is constant at 200 m/sec, and the distance PCD is varied within a range of 700 to 1000 mm. In a region R4 on the right side of the straight line SL2, the flow velocity is fast and flames are likely to be blown off, thereby causing unstable combustion. Curved line C2 indicates that a relationship of the ratio of PCD/Da and the flow velocity falls within a range defined by the lower-limit relationship and the upper-limit relationship. When the relationship of the ratio of PCD/Da and the flow velocity falls in a region R3 defined by the regions R1, R2 and R4, the aforementioned first and second conditions are satisfied and good combustion may be accomplished. When the height of the fireproof cylindrical portion 23 is changed, the tendency shown in FIG. 7 is also observed.

When taking account of effective utilization of the low-caloric fuel gas, an occurrence of recirculation phenomenon is not necessarily important. In other words, in view of effective utilization of the low-caloric fuel gas, it will be sufficient to securely heat the low-caloric fuel gas and let it combust or burn in the high-temperature cir combustion space. The high-caloric fuel gas is mixed with the pre-combustion air in advance and is partially burning. Therefore, the temperature of the high-caloric fuel gas has been elevated to a predetermined temperature when the high-caloric fuel gas reaches the mixing starting space CA in the high-temperature air combustion space. However, the volume of the low-caloric fuel gas is larger compared with that of the high-caloric fuel gas. Unlike the high-caloric fuel gas, it is difficult to elevate the temperature of the low-caloric fuel gas simply by mixing the low-caloric fuel gas with pre-combustion air and letting the low-caloric fuel gas partially burning. Then, in this embodiment, the injection ports 21 for low-caloric fuel gas are disposed apart from each other or are spaced around the injection port 20 for pre-combusting high-caloric fuel gas so that the low-caloric fuel gas may flow to the mixing staring space CA in the high-temperature air combustion space along with the flowing pre-combusting high-caloric fuel gas. The low-caloric fuel gas has been heated with heat of the pre-combusting high-caloric fuel gas before it reaches the mixing starting space. As a result, the high-temperature high-caloric fuel gas that is partially combusting due to the pre-combustion air, and the low-caloric fuel gas are mixed with the combustion air in the mixing starting space CA in the high-temperature air combustion space and then are efficiently burning there. In this embodiment, the low-caloric fuel gas may effectively be utilized without adversely affecting the high-temperature combustion even when the high-temperature air combustion technology is employed.

Especially, as with this embodiment, when the injection ports 21 for low-caloric fuel gas are disposed at an equidistant interval in a circumferential direction of an imaginary circle defined with respect of the center of the injection port 20 for pre-combusting high-caloric fuel gas, the low-caloric fuel gas may flow in a balanced manner around the pre-combusting high-caloric fuel gas. A plurality of flows of the low-caloric fuel gas do not significantly hinder or disturb the flow of the pre-combusting high-caloric fuel gas. Thus, stable high-temperature air combustion may be accomplished.

In the reactor of this embodiment as shown in FIG. 1, when the combustion air supply apparatus 9 of alternating heat exchange type supplies the combustion air and discharges the combustion exhaust gas at a flow velocity of 80 to 200 m/sec, the discharge amount of CO in the combustion exhaust gas may be reduced and the fuel gas may be more efficiently utilized by determining the air ratio of the combustion air and the pre-combustion air as described below. Specific conditions for the fuel gas combustion apparatus used are the same as those used in the simulation mentioned above.

Preferably, when an air amount of the combustion air supplied through the high-temperature air supply ports 2, 3 of the plurality of fuel gas combustion apparatuses is defined as Q1 and an air amount of the pre-combustion air to be mixed with the high-caloric fuel gas, supplied from the fuel gas combustion apparatuses, is defined as Q2, a total air amount (Q1+Q2) may be 1.02 to 1.10 times more than a theoretical air amount QS required for combustion, and a ratio of Q2/(Q1+Q2) may be 0.011 to 0.047. When the fuel gas combustion apparatus mentioned before is used, it is confirmed through the simulation and testing that stable combustion is accomplished by defining the air amount and ratio as mentioned above, thereby reducing the discharge amount of CO and increasing the efficient utilization of the fuel gas.

FIG. 8 shows a table that indicates the combustion states that have been observed when the pre-combustion air ratio of Q2/(Q1+Q2) is 0, 0.0038, 0.0075, 0.011, 0.015, 0.023, 0.035, and 0.047, and the air ratio λ of (Q1+Q2)/Qs is varied. As known from this table, in order to accomplish stable combustion indicated with a circle symbol ○ in FIG. 8, it is preferable that a total air amount (Q1+Q2) may be 1.02 to 1.10 times more than a theoretical air amount QS required for combustion, and a ratio of Q2/(Q1+Q2) may be 0.011 to 0.047, where Q1 denotes an air amount of the combustion air and Q2 denotes an air amount of the pre-combustion air to be mixed with the high-caloric fuel gas from the fuel gas combustion apparatuses. Also, as known from FIG. 8, out of these numeric ranges, incomplete combustion or unstable combustion is likely to occur as indicated with a triangle symbol Δ in FIG. 8, or incomplete combustion or unstable combustion is caused as indicated with a cross symbol X in FIG. 8. When incomplete or unstable combustion tends to occur, CO concentration in the combustion exhaust gas increases. Further, when incomplete or unstable combustion is caused, the CO concentration in the combustion exhaust gas furthermore increases.

On the combustion conditions mentioned above, it has been confirmed that radiant-portion heat efficiency $\eta$ of at least 60% of the target efficiency can be obtained. The radiant-portion heat efficiency $\eta$ is calculated as $\eta = Qd/Qf \times 100 = (Qf-Qw-Ql)/Qf \times 100$, where Qf stands for a combustion amount, Qd for an absorption heat amount in the radiant portion, Qw for a radiation amount from the reactor's walls, and Ql for a heat amount taken away by the exhaust gas.

The above-mentioned combustion conditions are applicable when the number of necessary fuel gas combustion apparatuses is increased in order to accomplish high-temperature air combustion, depending on the size of the combustion chamber when the combustion chamber of the reactor is expanded.

INDUSTRIAL APPLICABILITY

According to the present invention, the total air amount (Q1+Q2) is defined as 1.02 to 1.10 times more than a theoretical air amount QS required for combustion, and a ratio of Q2/(Q1+Q2) is defined as 0.011 to 0.047, where an air amount of the combustion air supplied through the high-temperature air supply ports of the plurality of fuel gas combustion apparatuses is defined as Q1 and an air amount of the pre-combustion air to be mixed with the high-caloric fuel gas, supplied from the fuel gas combustion apparatuses, is defined as Q2. As a result, stable combustion is accomplished, thereby reducing the discharge amount of CO and increasing the efficient utilization of the fuel gas.

According to the fuel gas combustion apparatus of the present invention, the high-caloric fuel gas is mixed with the pre-combustion air and is partially combusting; the low-caloric fuel gas has been heated with heat of the high-temperature pre-combusting high-caloric fuel gas before it reaches the mixing starting space in the high-temperature air combustion space; the pre-combusting high-caloric fuel gas and the preheated low-caloric fuel gas are mixed with the combustion air in the mixing starting space; and both of the gases start to burn together in a full scale. As a result, the fuel gas may efficiently be burned. According to the present invention, when the high-temperature air combustion technology is employed, the low-caloric fuel gas may effectively be utilized without adversely affecting the high-temperature air combustion. Further, according to the present invention, CO concentration in the combustion exhaust gas may considerably be reduced by using a particular burner assembly.

The invention claimed is:

1. A reactor employing high-temperature air combustion technology, including a combustion chamber and a plurality of fuel gas combustion apparatuses disposed at a predetermined interval, the plurality of fuel gas combustion apparatuses each comprising:
    a burner assembly for continuously injecting fuel gas into the combustion chamber, and
    a combustion air supply apparatus of alternating heat exchange type,
    the combustion air supply apparatus having two vent openings and including a regenerating means having air permeability, the combustion air supply apparatus using one of the two vent openings as a combustion exhaust gas discharge port to discharge combustion exhaust gas out of the combustion chamber via the regenerating means and using the other vent opening as a high-temperature air supply port to supply combustion air, which has been elevated to a high temperature with sensible heat of the regenerating means, to the combustion chamber, the two vent openings alternately switching to work as the combustion exhaust gas discharge port or the high-temperature air supply port,
    the burner assembly having an injection port for pre-combusting high-caloric fuel gas and a plurality of injection ports for low-caloric fuel gas that are disposed apart from each other in an area surrounding the injection port for pre-combusting high-caloric fuel gas, wherein
    high-caloric fuel gas and pre-combustion air are mixed to form high-temperature pre-combusting high-caloric fuel gas in which the high-caloric fuel gas is partially combusting, the pre-combusting high-caloric fuel gas is continuously injected into the combustion chamber through the injection port for pre-combusting high-caloric fuel gas, and the low-caloric fuel gas is continuously injected into the combustion chamber through the plurality of injection ports for low-caloric fuel gas;
    the low-caloric fuel gas is pre-heated with heat of the pre-combusting high-caloric fuel gas before the low-caloric fuel gas reaches a mixing starting space in the combustion chamber where the pre-combusting high-caloric fuel gas and the combustion air begin to mix with each other, and then the pre-combusting high-caloric fuel gas and the low-caloric fuel gas come to combust together in a full scale in the mixing starting space;
    the combustion air supply apparatus of alternating heat exchange type supplies the combustion air and discharges the combustion exhaust gas at a flow velocity of 80 to 200 m/sec; and
    when an air amount of the combustion air supplied through the high-temperature air supply ports of the plurality of fuel gas combustion apparatuses is defined as Q1 and an air amount of the pre-combustion air to be mixed with the high-caloric fuel gas, supplied from the fuel gas combustion apparatuses, is defined as Q2, a total air amount (Q1+Q2) is 1.02 to 1.10 times more than a theoretical air amount QS required for combustion, and a ratio of Q2/(Q1+Q2) is 0.011 to 0.047.

2. The reactor employing high-temperature air combustion technology according to claim 1, wherein
    in the fuel gas combustion apparatus, a distance L1 between the centerline of the injection port for pre-combusting high-caloric fuel gas and the centerline of each of the two vent openings and a height L2 from the two vent openings to the injection port for pre-combusting high-caloric fuel gas and the injection ports for low-caloric fuel gas are determined so that a part of the pre-combusting high-caloric fuel gas injected from the injection port for pre-combusting high-caloric fuel gas and/or a part of the low-caloric fuel gas injected from the injection ports for low-caloric fuel gas may be suppressed from being discharged through the vent opening working as the combustion exhaust gas discharge port before the pre-combusting high-caloric fuel gas and the low-caloric fuel gas reach the mixing starting space, and that the combustion exhaust gas may partially be prevented from being drawn into the combustion exhaust gas discharge port due to the existence of the pre-combusting high-caloric fuel gas injected from the injection port for pre-combusting high-caloric fuel gas and the low-caloric fuel gas injected from the injection ports for low-caloric fuel gas.

3. The reactor employing high-temperature air combustion technology according to claim 2, wherein
   the burner assembly of the fuel gas combustion apparatus includes a fireproof cylindrical portion having in a central location thereof the injection port for pre-combusting high-caloric fuel and a pre-combustion chamber communicating with the injection port for pre-combusting high-caloric fuel gas;
   the fireproof cylindrical portion has the plurality of injection ports for low-caloric fuel gas disposed at a predetermined interval in a circumferential direction thereof to surround the injection port for pre-combusting high-caloric fuel gas, and low-caloric fuel gas passages disposed to surround the pre-combustion chamber and communicating with the injection ports for low-caloric fuel gas; and
   the fireproof cylindrical portion also has an injection port for high-caloric fuel gas and an injection port for pre-combustion air on a bottom portion of the pre-combustion chamber.

4. The reactor employing high-temperature air combustion technology according to claim 2, wherein the height L2 is 50 to 600 mm.

5. The reactor employing high-temperature air combustion technology according to claim 4, wherein
   the two vent openings and the injection port for pre-combusting high-caloric fuel gas are arranged in a line with the injection port for pre-combusting high-caloric fuel gas disposed in the center of the line;
   the combustion air is supplied and the combustion exhaust gas is discharged at the flow velocity of 80 to 200 m/sec;
   the distance L1 is 350 to 500 mm;
   a distance PCD between the centers of the two vent openings, which is two times longer than the distance L1, and a diameter Da of each of the two vent openings are determined so that a ratio of PCD/Da may be 3 to 6.5; and
   on an assumption that a relationship of a possible setting for the ratio of PCD/Da and the flow velocity is defined as a lower-limit relationship when the distance PCD is 700 mm and the flow velocity is varied within a range of 80 to 200 m/sec and that a relationship of a possible setting for the ratio of PCD/Da and the flow velocity is defined as an upper-limit relationship when the distance PCD is 1000 mm and the flow velocity is varied within a range of 80 to 200 m/sec, the ratio of PCD/Da and the diameter Da are determined so that a relationship between the ratio of PCD/Da and the flow velocity may fall within a range defined by the lower-limit relationship and the upper-limit relationship.

6. A fuel gas combustion apparatus comprising:
   a burner assembly for continuously injecting fuel gas into the combustion chamber, and
   a combustion air supply apparatus of alternating heat exchange type,
   the combustion air supply apparatus having two vent openings and including a regenerating means having air permeability, the combustion air supply apparatus using one of the two vent openings as a combustion exhaust gas discharge port to discharge combustion exhaust gas out of the combustion chamber via the regenerating means and using the other vent opening as a high-temperature air supply port to supply combustion air, which has been elevated to a high temperature with sensible heat of the regenerating means, to the combustion chamber, the two vent openings alternately switching to work as the combustion exhaust gas discharge port or the high-temperature air supply port,
   the burner assembly having an injection port for pre-combusting high-caloric fuel gas and a plurality of injection ports for low-caloric fuel gas that are disposed apart from each other in an area surrounding the injection port for pre-combusting high-caloric fuel gas, wherein
   high-caloric fuel gas and pre-combustion air are mixed to form high-temperature pre-combusting high-caloric fuel gas in which the high-caloric fuel gas is partially combusting, the pre-combusting high-caloric fuel gas is continuously injected into the combustion chamber through the injection port for pre-combusting high-caloric fuel gas, and the low-caloric fuel gas is continuously injected into the combustion chamber through the plurality of injection ports for low-caloric fuel gas;
   the low-caloric fuel gas is pre-heated with heat of the pre-combusting high-caloric fuel gas before the low-caloric fuel gas reaches a mixing starting space in the combustion chamber where the pre-combusting high-caloric fuel gas and the combustion air begin to mix with each other, and then the pre-combusting high-caloric fuel gas and the low-caloric fuel gas come to combust together in a full scale in the mixing starting space.

7. The fuel gas combustion apparatus according to claim 6, wherein
   the plurality of injection ports for low-caloric fuel gas are disposed at an equidistant interval in a circumferential direction of an imaginary circle defined with respect of the center of the injection port for pre-combusting high-caloric fuel gas.

8. The fuel gas combustion apparatus according to claim 6, wherein
   the injection port for pre-combusting high-caloric fuel gas and the injection ports for low-caloric fuel gas are projecting more inwardly than the two vent openings in the combustion chamber.

9. The fuel gas combustion apparatus according to claim 8, wherein
   a distance L1 between the centerline of the injection port for pre-combusting high-caloric fuel gas and the centerline of each of the two vent openings and a height L2 from the two vent openings to the injection port for pre-combusting high-caloric fuel gas and the injection ports for low-caloric fuel gas are defined so that a part of the pre-combusting high-caloric fuel gas injected from the injection port for pre-combusting high-caloric fuel gas and/or a part of the low-caloric fuel gas injected from the injection ports for low-caloric fuel gas may be suppressed from being discharged through the vent opening working as the combustion exhaust gas discharge port before the pre-combusting high-caloric fuel gas and the low-caloric fuel gas reach the mixing starting space, and that the combustion exhaust gas may partially be prevented from being drawn into the combustion exhaust gas discharge port due to the existence of the pre-combusting high-caloric fuel gas injected from the injection port for pre-combusting high-caloric fuel gas and the low-caloric fuel gas injected from the injection ports for low-caloric fuel gas.

10. The fuel gas combustion apparatus according to claim 7, wherein
    the burner assembly includes a fireproof cylindrical portion having in a central location thereof the injection port for pre-combusting high-caloric fuel and a pre-combustion chamber communicating with the injection port for pre-combusting high-caloric fuel gas, the fireproof cylindrical portion has the plurality of injection ports for low-caloric fuel gas disposed at a predetermined interval in a circumferential direction thereof to surround the injection port for pre-combusting high-caloric fuel gas, and low-caloric fuel gas passages disposed to surround the pre-combustion chamber and communicating with the injection ports for low-caloric fuel gas; and the fireproof cylindrical portion also has an injection port for high-caloric fuel gas and an injection port for pre-combustion air on a bottom portion of the pre-combustion chamber.

11. The fuel gas combustion apparatus according to claim 9, wherein the height L2 is 50 to 600 mm.

12. The fuel gas combustion apparatus according to claim 6, wherein the two vent openings and the injection port for pre-combusting high-caloric fuel gas are arranged in a line with the injection port for pre-combusting high-caloric fuel gas disposed in the center of the line;

the combustion air is supplied and the combustion exhaust gas is discharged at the flow velocity of 80 to 200 m/sec;

the distance L1 is 350 to 500 mm;

a distance PCD between the centers of the two vent openings, which is two times longer than the distance L1, and a diameter Da of each of the two vent openings are determined so that a ratio of PCD/Da may be 3 to 6.5; and on an assumption that a relationship of a possible setting for the ratio of PCD/Da and the flow velocity is defined as a lower-limit relationship when the distance PCD is 700 mm and the flow velocity is varied within a range of 80 to 200 m/sec and that a relationship of a possible setting for the ratio of PCD/Da and the flow velocity is defined as an upper-limit relationship when the distance PCD is 1000 mm and the flow velocity is varied within a range of 80 to 200 m/sec, the ratio of PCD/Da and the diameter Da are determined so that a relationship between the ratio of PCD/Da and the flow velocity may fall within a range defined by the lower-limit relationship and the upper-limit relationship.

13. The fuel gas combustion apparatus according to claim 6, wherein the pre-combustion air is heated with heat of the combustion exhaust gas discharged from the combustion air supply apparatus of alternating heat exchange type.

14. The fuel gas combustion apparatus according to claim 13, wherein the combustion air supply apparatus of alternating heat exchange type includes a pre-combustion air passage through which the pre-combustion air passes, the pre-combustion air passage being disposed between two flow passages arranged between the two vent openings and two of the regenerating means so as to be capable of thermal transfer between the pre-combustion air passage and the two flow passages.

* * * * *

UNITED STATES PATENT AND TRADEMARK OFFICE
CERTIFICATE OF CORRECTION

PATENT NO. : 8,403,662 B2 Page 1 of 1
APPLICATION NO. : 12/665163
DATED : March 26, 2013
INVENTOR(S) : Mikuriya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 616 days.

Signed and Sealed this
First Day of September, 2015

Michelle K. Lee
*Director of the United States Patent and Trademark Office*